(12) United States Patent
Burchert

(10) Patent No.: US 6,401,877 B1
(45) Date of Patent: Jun. 11, 2002

(54) BRAKE BLOCK FOR A BRAKE OF AN OPEN-END SPINNING ROTOR

(75) Inventor: Mathias Burchert, Deggingen (DE)

(73) Assignee: Wilhelm Stahlecker GmbH, Deggingen-Reichenbach i.T. (DE)

(*) Notice: Subject to any disclaimer, the term of this patent is extended or adjusted under 35 U.S.C. 154(b) by 0 days.

(21) Appl. No.: 09/916,448

(22) Filed: Jul. 30, 2001

(30) Foreign Application Priority Data

Aug. 3, 2000 (DE) .......................... 100 37 807

(51) Int. Cl.⁷ .............................. D01H 4/08; D01H 7/22
(52) U.S. Cl. .................. 188/71.1; 57/88; 188/73.1; 188/250 G; 188/72.9
(58) Field of Search ............... 188/71.1, 250 G, 188/73.1, 72.9, 382, 72.7, 250 B; 57/88, 78, 263, 302, 301, 400, 406; 242/486.2, 476.6; 192/70.14, 107 R, 52.1

(56) References Cited

U.S. PATENT DOCUMENTS 4,989,401 A * 2/1991 Feuchter .................. 57/88
5,184,452 A * 2/1993 Stahlecker .................. 57/78
5,950,414 A * 9/1999 Wassenhoven ............... 57/406
5,964,084 A * 10/1999 Wassenhovenn et al. ..... 57/406
5,987,872 A * 11/1999 Wessenhoven ................ 57/88

FOREIGN PATENT DOCUMENTS

DE 19618261 A1 11/1997

* cited by examiner

Primary Examiner—Douglas C. Butler
(74) Attorney, Agent, or Firm—Crowell & Moring LLP

(57) ABSTRACT

A brake block for a brake of an open-end spinning rotor includes a take-up for releasable affixing to a brake block support. The brake block has at least two braking surfaces, whereby one braking surface in relation to the supporting surface of the open-end spinning rotor is, in comparison to the other braking surface, set back a certain distance. The result is that, during the first operational application of the brake block, only one braking surface touches the open-end spinning rotor, while the other braking surface comes into effect only after a predetermined amount of wear of the first braking surface.

16 Claims, 2 Drawing Sheets

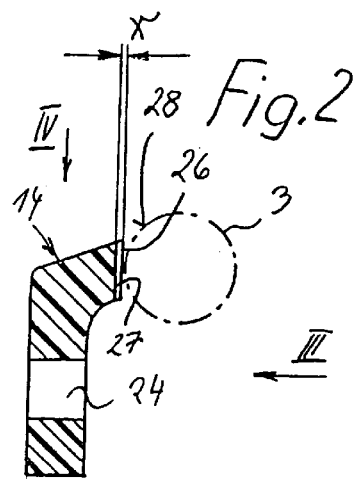
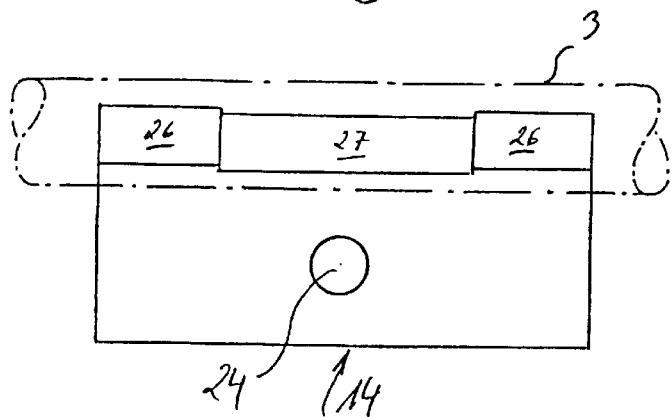
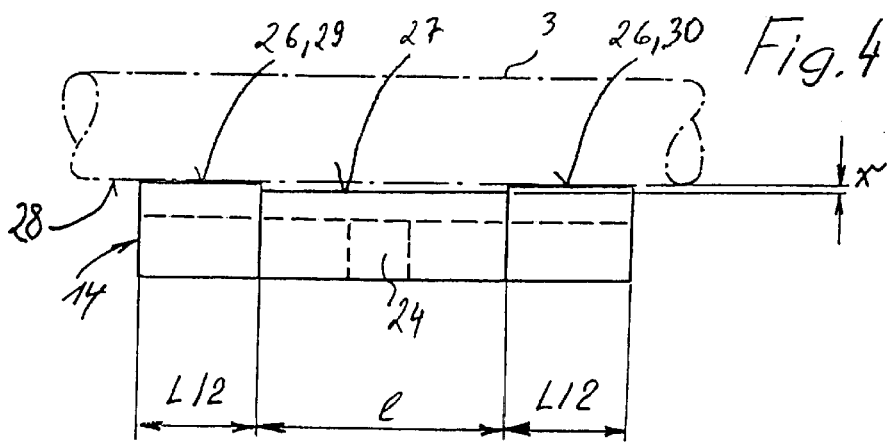

BRAKE BLOCK FOR A BRAKE OF AN OPEN-END SPINNING ROTOR

BACKGROUND OF THE INVENTION

This application claims the priority of German Patent Document No. 10037807.2, filed Aug. 3, 2000, the disclosure of which is expressly incorporated by reference herein.

The present invention relates to a brake block for a brake braking an open-end spinning rotor, comprising a take-up for releasable affixing to a brake block support, also comprising at least a first braking surface and a second braking surface.

Brake blocks for brakes for open-end spinning rotors have the disadvantage that they have to be exchanged before they have reached the maximum permissible amount of wear, because the brake effect is no longer sufficient due to a smoothing of the surface. For this reason, it is known in the prior art (German published patent application 196 18 261), to provide brake blocks with two applicable sides. This means that the brake block does not immediately become unusable due to wear, but rather that, after the brake block supporter is released, the brake block is simply turned around and can be re-used by applying its second braking surface after it has been re-affixed to the brake block supporter. The material of the brake block is thus better utilized. The disadvantage remains, however, in that the brake blocks must be turned around at all spinning stations of an open-end spinning machine, which is extremely time-consuming.

It is an object of the present invention to design a brake block of the above mentioned type in such a way that an intermediary turning around in order to increase the life of the brake block becomes superfluous.

This object has been achieved in accordance with the present invention in that, the first braking surface and the second braking surface face in the same direction, the second braking surface is set back a certain distance in comparison to the first braking surface, so that the second braking surface comes into contact with the open-end spinning rotor only after wear of the first braking surface.

In preferred embodiments, the first braking surface is effective directly after the first assembly until it reaches a certain degree of wear. Hereafter, the second braking surface comes into effect, in addition to the first, braking surface. As the second braking surface is still unused, it can be assumed that there is an improvement in brake action in the sum of the braking effect of the first and the second braking surface even in the second life span of the brake block.

Theoretically, more than two different braking surfaces can be realised. The number of possible braking surfaces is determined by the permissible surface pressure of each braking surface. It is in any case possible, due to the features of the present invention, to at least partly compensate for the reduced friction coefficient of the first braking surface by means of the second braking surface which is then supported on the open-end spinning rotor, hereby increasing the life of the brake block.

In certain preferred embodiment of the invention, the first braking surface and/or the second braking surface can consist of section surfaces at a distance from one another. It is for example possible that the first braking surface consists of two section surfaces, between which the second braking surface is arranged. Thus the symmetry is ensured for the entire lifetime of the brake block. To this end, the two section surfaces of the first braking surface are together approximately the same length as the second braking surface. Favorable values have been achieved for open-end spinning rotors when the entire length of the two section surfaces of the first braking surface and the length of the second braking surface are each approximately the same and measure approximately 15 to 20 mm in length.

It has been established as advantageous when the amount by which the second braking surface is set back in relation to the first braking surface corresponds to approximately half the lifetime of the brake block. For example, the amount by which the second braking surface is set back can measure between 0.4 mm and 0.8 mm.

These and further objects, features and advantages of the present invention will become more readily apparent from the following detailed description thereof when taken in conjunction with the accompanying drawings.

BRIEF DESCRIPTION OF THE DRAWINGS

FIG. 2 is a brake block of FIG. 1 shown in isolation;

FIG. 3 is a view on the brake block according to the arrow direction III of FIG. 2; and FIG. 4 is a view of a brake block in the direction of the arrow IV of FIG. 2.

DETAILED DESCRIPTION OF THE DRAWINGS

Figure 1:
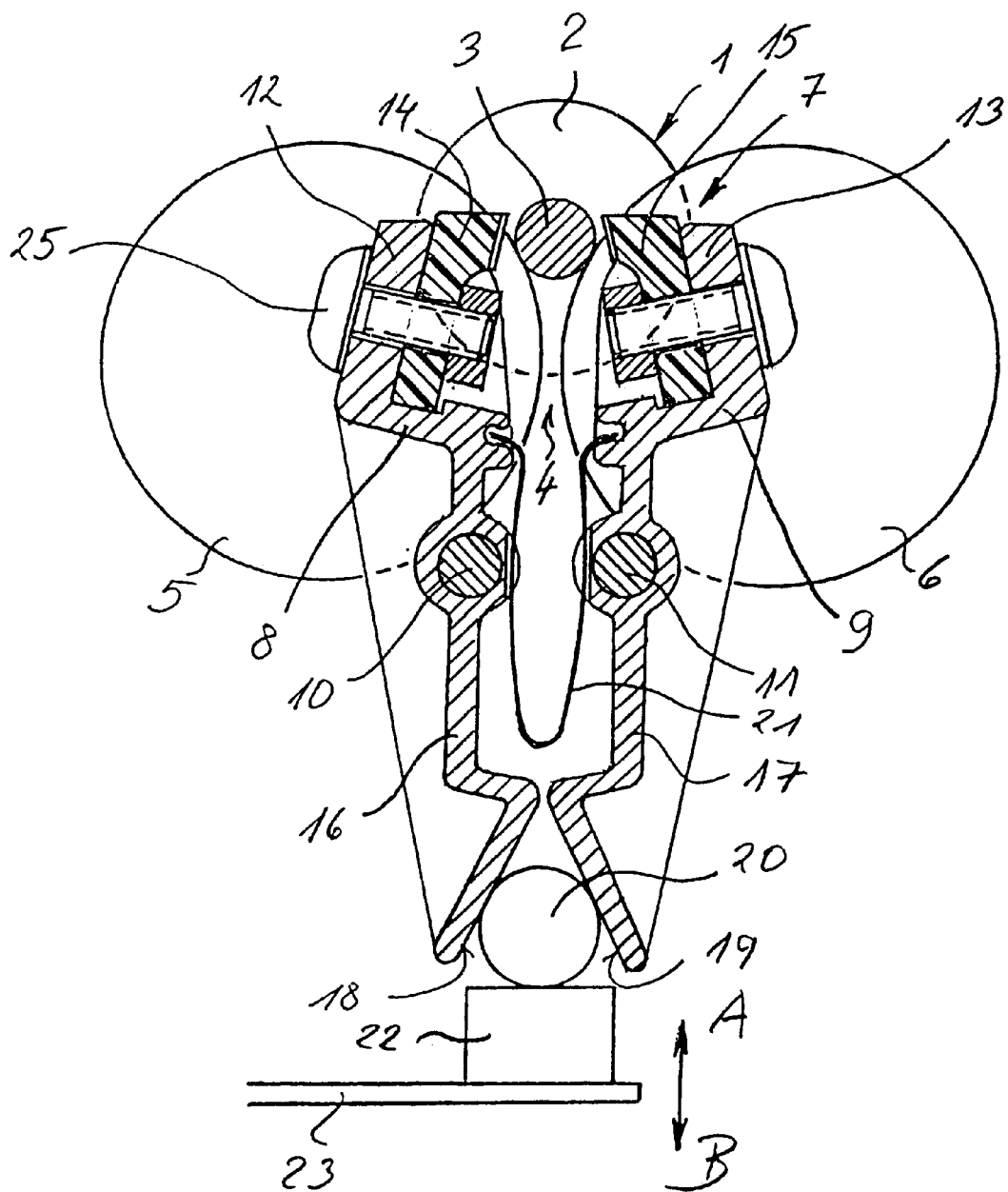
FIG. 1 is a cross section of an open-end spinning rotor comprising a brake designed according to the present invention.

In FIG. 1, an open-end spinning rotor 1 comprising a rotor cup 2 and a shaft 3 can be seen. The rotor cup 2 is tightly coupled with the shaft 3, which in turn in supported in the wedge-shaped gaps 4 of two supporting disk pairs, of which only one supporting disk pair comprising the supporting disks 5 and 6 can be seen.

The shaft 3, disposed horizontally in the wedge-shaped gaps 4, is driven by means of a tangential belt (not shown) which extends in machine longitudinal direction, which tangential belt drives the shafts 3 of all open-end spinning rotors 1 of the spinning aggregates of one machine side.

A brake 7 is arranged at the open-end spinning rotor 1, with which brake 7 the shaft 3 is clamped pincer-like and braked. The brake 7 is arranged between the supporting disk pairs in the area below the tangential belt. The brake 7 comprises two pincer arms 8 and 9, which can be swivelled around stationary axles 10 and 11. The axles 10 and 11 extend parallel to the shaft 3 and are arranged below them. The pincer arms 8,9 facing the shaft 3 are designed as brake block supports 12,13, which support brake blocks 14,15, which can be placed to the shaft 3.

Both of the arms 16,17 of the mirror-symmetrically arranged pincer arms 8,9, which arms 16,17 are facing away from the brake block 14,15, are provided with sliding surfaces 18,19, which encompass between them an obtuse or an apex angle. The bisecting line of the angle between the sliding surfaces 18,19 extends through the axis of the shaft 3.

Between the two sliding surfaces 18,19 of the arms 16,17, a spreading element 20 can be pressed, so that the two arms 16 and 17 are spread apart and the brake blocks 14,15 are moved toward the shaft 3. The return movement is effected by means of a bow spring 21, which is arranged between the brake block supports 12,13.

The spreading element 20 is designed as a cylindrical roller, which is preferably made from a wear-resistant plastic. The roller extends with its axis parallel to the axles 10,11 and the shaft 3. The roller is supported by a disk 22, which is arranged in such a way on a brake lever 23, that by means of swivelling of the brake lever 23 in arrow direction A, the roller is pressed deeper into the sliding surfaces 18,19.

In order to release the brake 7, the bow spring 21 presses the two pincer arms 8,9 apart, by which the spreading element 20 is pushed downwards back between the sliding surfaces 18,19, while the brake lever 23 is moved in arrow direction B.

As a result of a smoothing of the surface, the friction properties of the brake blocks 14 and 15 lessen long before a maximum permissible rate of wear has been reached, so that the braking effect is no longer sufficient. For this reason, the brake blocks 14 and 15 are designed in a particular way according to the present invention.

The actual invention is described in more detail below with the aid of FIGS. 2, 3 and 4, which show three different views of a brake block 14. The brake block 14 is recognizable, as is the shaft 3, denoted only by a dot-dash line, of an open-end spinning rotor 1.

The brake block 14 like the other brake block 15 not shown in FIGS. 2 to 4 has a take-up 24 for a releasable affixing to the brake block supports 12,13. In the case of the present embodiment, the take-up 24 is designed as a bore hole for a screw. It is alternatively possible, in a way similar to the above mentioned prior art, to provide a clip connection for the purpose of releasable affixing.

In order to brake, the brake block 14 is pushed to a supporting surface 28 of the shaft 3 of the open-end spinning rotor 1. The brake block 14 has for the purpose a first braking surface 26, which alone is placed to the supporting surface 28 in the first operational application of the brake block 14 after its assembly. There is a second braking surface 27, which is set back in relation to the first braking surface 26 by a certain amount x, for example 0.6 mm, which, however, rests only then on the supporting surface 28 when the first braking surface 26 has been worn down by the amount x. It can be seen in particular in FIG. 4, that the first braking surface 26 consists of two section surfaces 29 and 30, which each have a length L/2 and which together measure the same length 1 as the second braking surface 27.

Because it is provided that the two braking surfaces 26 and 27 come into effect one after the other, the brake block 14 is longer than usual, for example (L+1)=35 mm in length.

The amount x has been set as a result of tests in such a way that the second braking surface 27 comes to rest on the supporting surface 28 when the friction coefficient of the first braking surface 26 is just barely sufficient. The friction coefficient of the first braking surface 26, reduced by the amount x due to wear, can be compensated for in a second period of the lifetime by means of the second braking surface 27 which now becomes effective.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Brake block for a brake operable in use to brake an open-end spinning rotor, comprising a take-up for releasable affixing to a brake block support, also comprising at least a first braking surface and a second braking surface, wherein the first braking surface and the second braking surface face in the same direction, and wherein the second braking surface is set back by a predetermined amount in comparison to the first braking surface, so that the second braking surface then comes to rest on the open-end spinning rotor after wear of the first braking surface.

2. Brake block according to claim 1, wherein the first braking surface and/or the second braking surface consist of at least two section surfaces set at a distance from one another in a longitudinal direction of a shaft of the open-end spinning rotor.

3. Brake block according to claim 2, wherein the first braking surface consists of two section surfaces, between which the second braking surface is arranged.

4. Brake block according to claim 3, wherein the two section surfaces of the first braking surface in longitudinal direction of the shaft together measure the same length as the second braking surface.

5. Brake block according to claim 4, wherein the overall length of the first braking surface and the length of the second braking surface each measures approximately 15 to 20 mm.

6. Brake block according to claim 1, wherein the predetermined amount by which the second braking surface is set back in comparison to the first braking surface corresponds to approximately half the lifetime of the brake block.

7. Brake block according to claim 2, wherein the predetermined amount by which the second braking surface is set back in comparison to the first braking surface corresponds to approximately half the lifetime of the brake block.

8. Brake block according to claim 3, wherein the predetermined amount by which the second braking surface is set back in comparison to the first braking surface corresponds to approximately half the lifetime of the brake block.

9. Brake block according to claim 4, wherein the predetermined amount by which the second braking surface is set back in comparison to the first braking surface corresponds to approximately half the lifetime of the brake block.

10. Brake block according to claim 5, wherein the predetermined amount by which the second braking surface is set back in comparison to the first braking surface corresponds to approximately half the lifetime of the brake block.

11. Brake block according to claim 6, wherein the predetermined amount measures approximately 0.4 to 0.8 mm.

12. Brake block according to claim 7, wherein the predetermined amount measures approximately 0.4 to 0.8 mm.

13. Brake block according to claim 8, wherein the predetermined amount measures approximately 0.4 to 0.8 mm.

14. Brake block according to claim 9, wherein the predetermined amount measures approximately 0.4 to 0.8 mm.

15. Brake block according to claim 10, wherein the predetermined amount measures approximately 0.4 to 0.8 mm.

16. An open end spinning rotor brake assembly comprising:

a movable arm, a brake block, attaching means for detachably attaching the brake block to the movable arm, and means for moving the movable arm between a non-braking position with the brake block out of engagement with a rotor shaft and a braking position with the brake block engaging the rotor shaft, wherein the brake block includes a plurality of brake surface sections facing the rotor shaft when in an in use position, and wherein respective brake surface sections are disposed offset from one another in a direction transverse to the rotor shaft such that different brake surface sections engage the rotor shaft during use of the brake block with consequent wear of the respective brake surface sections.

* * * * *